United States Patent [19]

Meyer et al.

[11] Patent Number: 4,489,876
[45] Date of Patent: Dec. 25, 1984

[54] METHOD OF MAKING A FABRICATED SHEET METAL COMPRESSION MOLD

[75] Inventors: Leonard S. Meyer, Columbia, S.C.; Michael J. Murray, Orange Lake, Fla.; Gerald G. Hayes; Robert L. McClain, both of Gainesville, Fla.

[73] Assignee: Kidde Recreation Products, Inc., Northbrook, Ill.

[21] Appl. No.: 481,142

[22] Filed: Mar. 29, 1983

Related U.S. Application Data

[62] Division of Ser. No. 228,703, Jan. 23, 1981, Pat. No. 4,390,156.

[51] Int. Cl.³ .............................................. B23K 31/00
[52] U.S. Cl. ................................ 228/170; 228/173 C; 228/174
[58] Field of Search .............. 228/160, 170, 182, 184, 228/172, 173 C, 174, 165; 29/155 R; 264/219; 425/407, 412; 249/135, 160

[56] References Cited

U.S. PATENT DOCUMENTS

| | | | |
|---|---|---|---|
| 2,458,302 | 1/1949 | Richardson | 228/182 |
| 2,949,667 | 8/1960 | Cameron et al. | 228/173 C |
| 2,969,544 | 1/1961 | Di Marco et al. | 249/160 |
| 3,267,561 | 8/1966 | Richer et al. | 228/182 |
| 3,955,266 | 5/1976 | Honami | 264/219 |

Primary Examiner—Kenneth J. Ramsey
Assistant Examiner—M. Jordan
Attorney, Agent, or Firm—Emory L. Groff, Jr.

[57] ABSTRACT

A compression mold includes punch and cavity components fabricated from initially flat sheets of relatively thin metal. The sheets of each component are shaped, assembled and joined to provide box-like components defining mating mold surfaces yielding molded parts which may be straight or laterally and/or vertically curved. The hollow interior of the two components allows for the circulation therethrough of an appropriate heat transfer medium to permit molding of either thermosetting or thermoplastic compounds.

8 Claims, 20 Drawing Figures

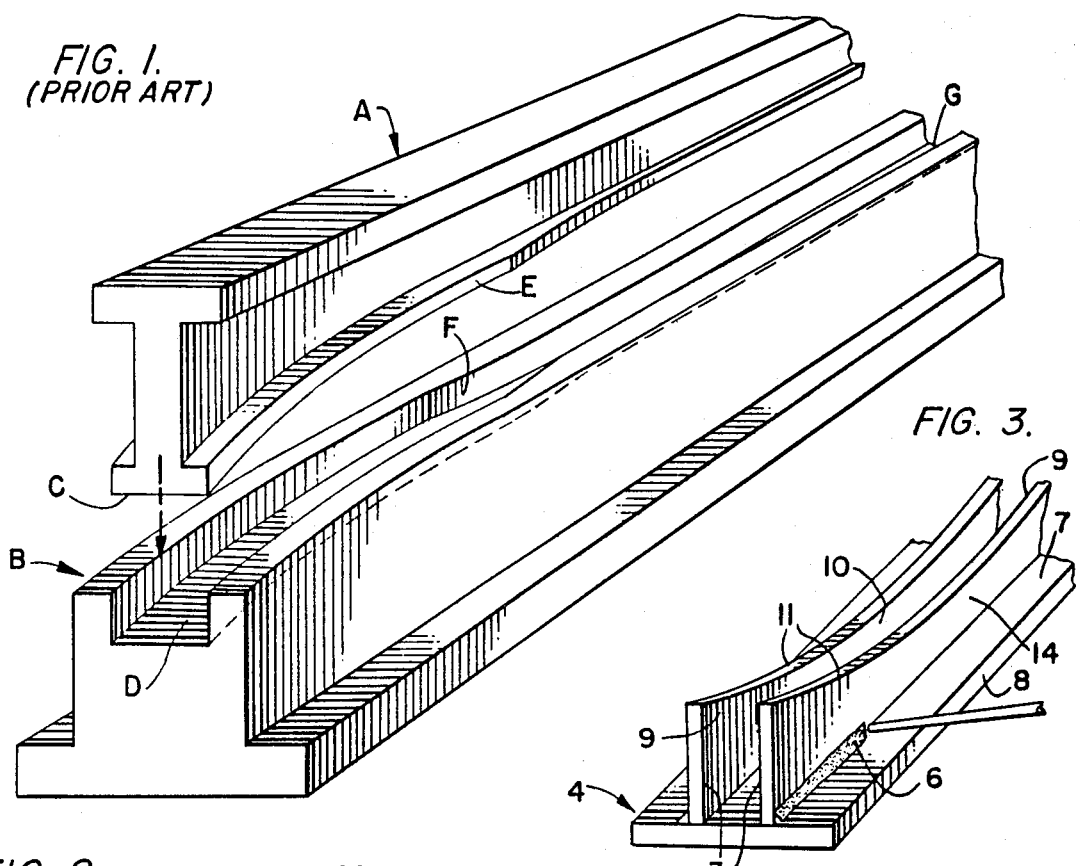
FIG. 1. (PRIOR ART)
FIG. 3.
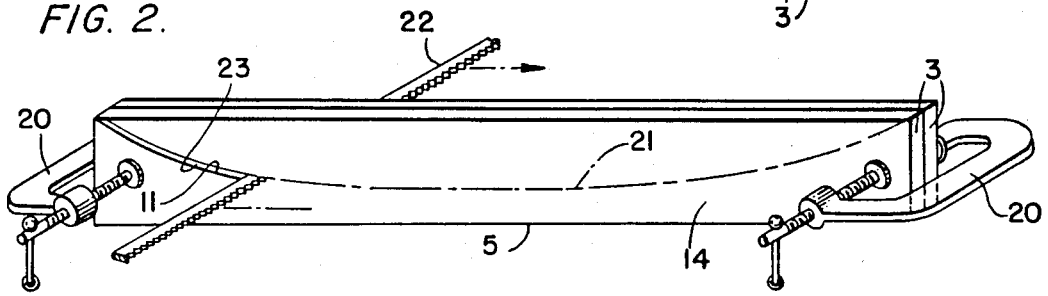
FIG. 2.
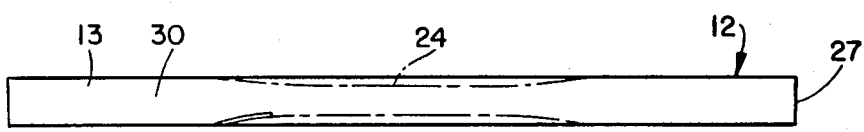
FIG. 4.
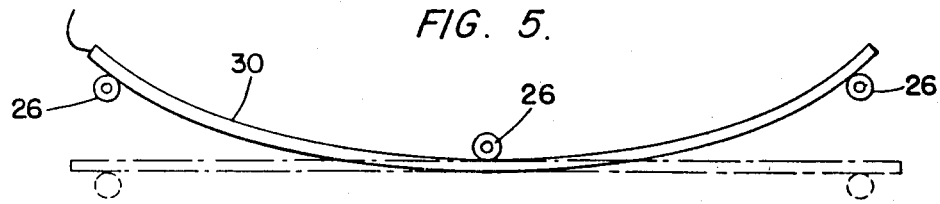
FIG. 5.

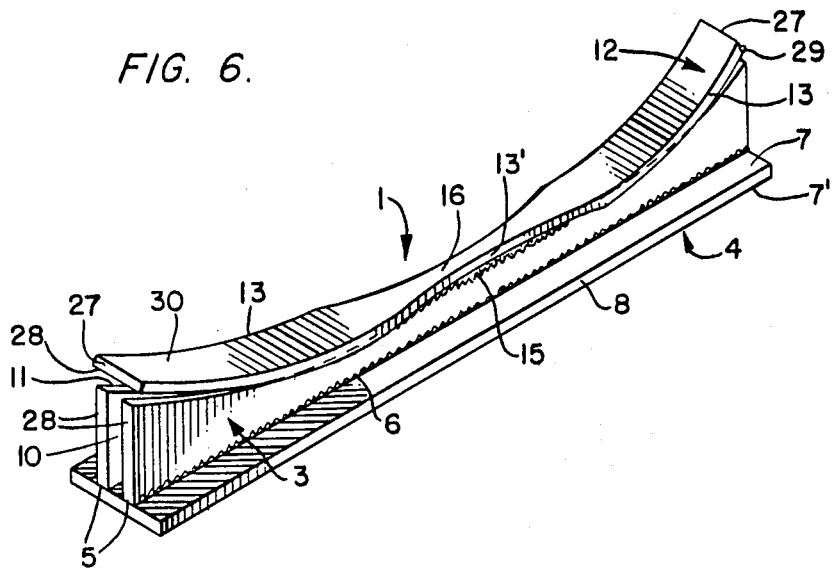
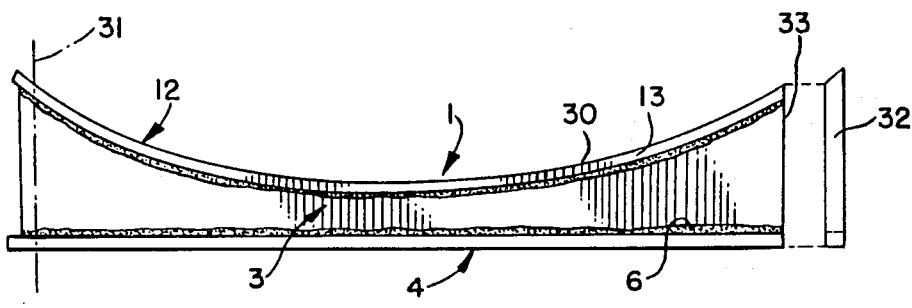
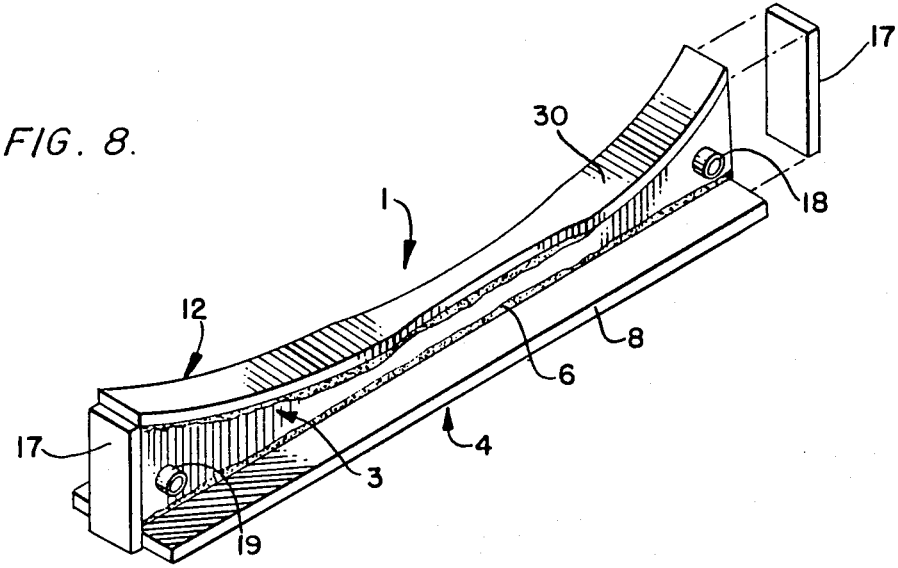

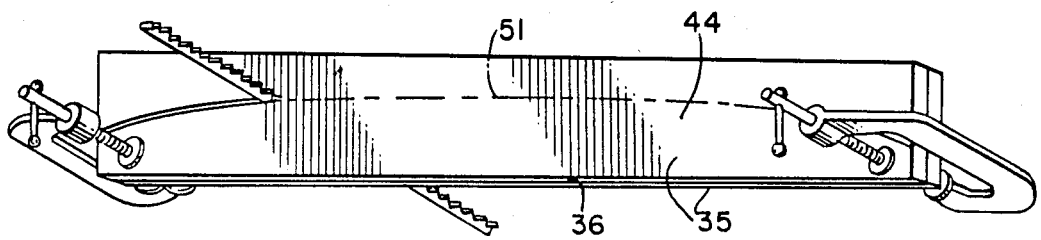
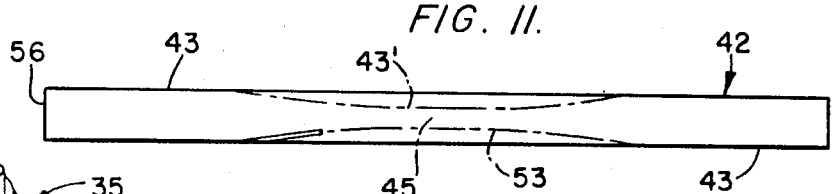
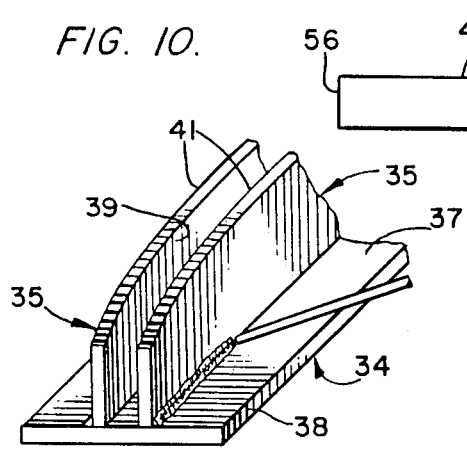
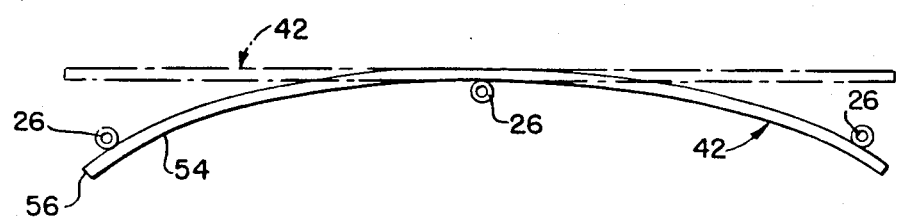
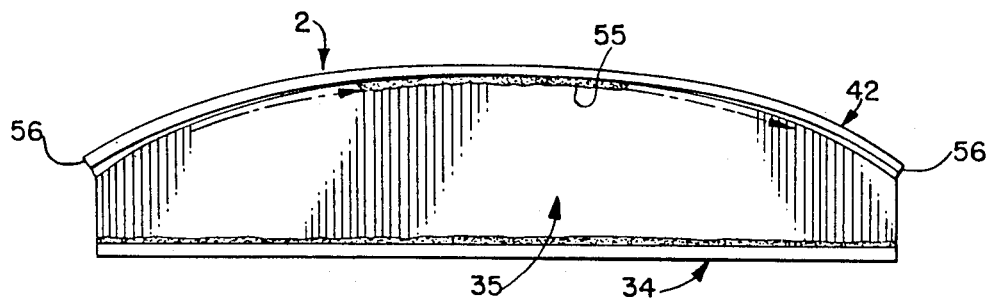

METHOD OF MAKING A FABRICATED SHEET METAL COMPRESSION MOLD

This is a division of application Ser. No. 228,703, filed Jan. 23, 1981 now Pat. No. 4,390,156.

BACKGROUND OF THE INVENTION

This invention relates generally to compression molds and a method of making same and more particularly, to an improved mold apparatus fabricated from a plurality of sheet metal plates of relatively minimal thickness.

Compression molding usually involves the provision of cooperating punch and cavity mold components mounted within suitable structure producing a reciprocating movement between the two opposed components. A conventional mold component comprises a unitary block of massive metal which has been machined to provide the required surface configuration in order to produce the desired molded part. Such construction is necessary in a production operation since it is not uncommon for compression mold components to be subjected to thousands of molding cycles per day, with a lifetime duty often involving hundreds of thousands or even millions of cycles. Thus, the conventional compression mold components must be machined from massive unitary metal blocks so that the mating or cooperating mold surfaces will maintain the precision dimensional relationship therebetween throughout its expected lifetime of use, it being appreciated that each molding cycle usually involves extreme pressure.

The cost of constructing the components of a compression mold assembly comprises a major expense which is usually justified in view of the anticipated production run scheduled for the components. The large manufacturer or a small business man with an order for a large production run of any particular molded part can justify the expense of a machined compression mold assembly. On the other hand, a small producer or anyone desiring to form only a few parts from any one mold assembly, could not normally afford to undergo the expense of having compression mold components machined to particular specifications since the limited production run would not begin to recover the cost of such an expensive apparatus.

In addition to the cost factor discussed hereinabove, the lead time for a molding operator to acquire conventional compression mold components is significant. By the present invention, an improved compression mold apparatus is proposed and which readily lends itself to filling a void encountered by a small producer or any producer who desires only to form a limited number of molded parts according to a single specific mold assembly. Experimental operations will substantially benefit from this invention as it will enable the rapid and economical fabrication of compression mold components particularly adapted for the formation of prototype molded parts. In the past, considerable deliberation has been required on the part of management before agreeing to commit funds for the construction of the more conventional machined compression mold components and often only the large manufacturer could afford such expense when the mold apparatus was not to be utilized in a production-run operation.

SUMMARY OF THE INVENTION

Accordingly, one of the objects of the present invention is to provide an improved compression mold including punch and cavity elements each fabricated from a plurality of flat sheet metal plates of minimal thickness.

Another object of the present invention is to provide an improved compression mold including punch and cavity elements of sheet metal stock defining elongated mold cavity having a compound curvature.

Still another object of the present invention is to provide an improved compression mold apparatus including cooperating punch and cavity elements each fabricated of sheet metal stock defining an elongated and curved mold cavity with each element including an inner chamber adapted to contain a heat transfer medium.

A further object of the present invention is to provide an improved method of making a compression mold apparatus including the steps of configuring flat, sheet metal plates and assembling the same to provide cooperating punch and cavity elements defining an elongated curved mold cavity therebetween.

With these and other objects in view which will more readily appear as the nature of the invention is better understood, the invention consists in the novel construction, combination and arrangement of parts hereinafter more fully described, illustrated and claimed.

BRIEF DESCRIPTION OF THE DRAWING

FIG. 1 is a partial top perspective view of a typical conventional form of punch and cavity mold components;

FIG. 2 is a perspective view illustrating the fabrication of a pair of side plates employed in the punch element of the present invention;

FIG. 3 is a partial top perspective view of the side plates of FIG. 2 being assembled to a mounting plate;

FIG. 4 is a top plan view of the forming plate of the punch element according to the present invention;

FIG. 5 is a side elevation illustrating a subsequent forming step upon the punch plate of FIG. 4;

FIG. 6 is a top perspective view illustrating the attachment of the punch forming plate to the side plates of the punch element;

FIG. 7 is a side elevation of the structure of FIG. 6 and illustrates the removal of trim at the ends of the punch element;

FIG. 8 is a top perspective view of the structure of FIG. 7 and illustrates the attachment of the end plates;

FIG. 9 is a perspective view similar to FIG. 2 but illustrates the fabrication of a pair of support plates as used in the construction of the cavity mold element according to the present invention;

FIG. 10 is a partial top perspective view illustrating the attachment of the support plates of FIG. 9 to a mounting plate;

FIG. 11 is a top plan view of the mold cavity plate;

FIG. 12 is a side elevation illustrating a bending operation upon the cavity plate of FIG. 11;

FIG. 13 is a side elevation illustrating the attachment of the bent cavity plate of FIG. 12 to the cavity element structure of FIG. 10;

DESCRIPTION OF THE PREFERRED EMBODIMENT

Figure 15:
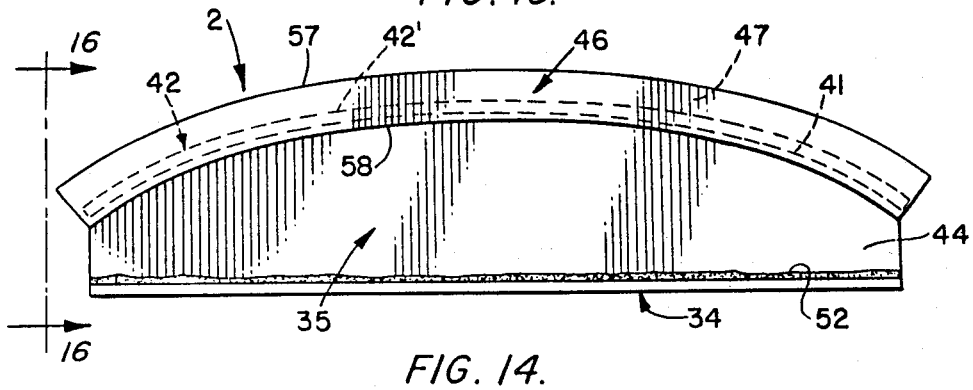
FIG. 15 is a side elevation with the cavity plates of FIG. 14 assembled to the cavity element structure of FIG. 13.

Similar reference characters designated corresponding parts throughout the several figures of the drawings.

Referring now to the drawings, FIG. 1 will be understood to depict an example of a conventional compression mold assembly comprising punch element A and cavity element B and wherein each of these two elements is constructed from a massive, unitary block of steel with the cooperating male and female portions thereof being precisely machined to produce the desired configuration of a specific molded part formed therebetween. The horizontal, opposed walls C and D of the two elements illustrated in this figure are vertically curved while the adjacent side walls E and F thereof will be seen to be horizontally or laterally curved. In this manner the resultant mold cavity G formed between the closely fitting cooperating elements will be understood to comprise an elongated cavity leading to the formation of longitudinally extending molded parts having a compound curvature that is, wherein the molded part will be curved vertically as well as horizontally. The multiple, irregular curves of the above example will serve to point out the expensive and time consuming efforts that can be required to construct a conventional compression mold assembly by the well known machining technique, especially when the assembly is intended for the production of molded parts of compound curvature.

The present invention on the other hand, provides for a far more economical mold apparatus which may be rapidly assembled by the fabrication and joining of a plurality of relatively thin sheet metal plates, the steps of which are illustrated in FIGS. 2-18 of the drawings. The remaining FIGS. 19-20 discloses the punch element 1 and cavity element 2 as fabricated according to the present invention, as they would appear when positioned within a molding apparatus.

The fabrication of the punch element 1 is shown in FIGS. 2-8 while FIGS. 9-18 relate to the fabrication of the cavity element 2.

The punch element 1 is disclosed most clearly in FIGS. 6 and 8 of the drawings, and will be seen to include a pair of laterally spaced apart side plates 3—3 fixedly attached to a base or mounting plate 4 with the longitudinally extending planar edges 5 of the two plates securely affixed such as by welding 6 to a first surface 7 of the mounting plate 4, having an opposite second surface 7', with the edges 5 disposed along parallel lines well spaced inwardly of the longitudinally extending lateral edges 8 of the mounting plate. As shown in FIGS. 3 and 6, the two side plates 3—3 are substantially spaced apart from one another with the inner faces 9—9 thereof defining a chamber 10 therebetween. The edge of the longitudinally extending side plates 3 opposite that of the planar edge 5 may be contoured as at 11 according to the specifications of the molded part intended to be produced by the mold apparatus. In the illustrated construction, the contoured edge 11 defines a concave configuration corresponding to the vertical configuration of the end product which will be formed by the mold assembly.

Spanning the two side plates 3 is the punch forming plate 12, the lateral edges 13 of which will be understood to extend outwardly to a point fully overlying the outer faces 14 of the two side plates 3 for reasons for which will become obvious hereinafter. The forming plate 12 is suitably affixed to the two side plates 13 such as by the weld bead 15 joining the forming plate 12 to each of the side plates 3.

As shown in FIGS. 6 and 8, the lateral edges 13 may be regularly or irregularly configured according to the curvature of the desired end product and may include a reduced or necked-in portion 16. The aforementioned chamber 10 is completely enclosed by means of suitable end plates 17 affixed to both ends of the punch element 1 while appropriate fittings are included to provide a fluid inlet 18 and outlet 19 in communication with the enclosed chamber 10.

The present invention includes a unique method for assembling the above described fabricated punch 1 and begins with the formation of the two side plates 3—3. As shown in FIG. 2, both side plates 3 are simultaneously configured by sandwiching a pair of metal plates and securing them in this position by means of temporary fastening devices such as the illustrated clamps 20. A cutting line 21 is indicated on the outer face 14 of one of the metal plates and represents the contour defining the vertical configuration of the ultimate molded part. Appropriate cutting means such as the illustrated saw blade 22 then follows the cutting line 21 with the resultant kerf 23 forming the previously described contoured edges 11 on the two side plates 3—3. With the two side plates 3 thusly fabricated, they are secured to the first surface 7 of the mounting plate 4 such as by the weld bead 6 as shown in FIG. 3 of the drawings. As noted, the outer faces 14 of the two side plates are well spaced inwardly from the lateral edges 8 of the mounting plate while at the same time the opposed inner faces 9—9 of the two side plates are substantially spaced apart from one another to define the chamber 10 therebetween. In all instances, the distance between the outer faces 14 of the two side plates must be no greater than the minimum width of the molded part intended to be produced by the subject apparatus.

The punch forming plate 12 is fabricated as shown in FIGS. 4 and 5 of the drawings, with the starting material comprising a relatively thin and flat metal plate. This plate is initially configured to reflect any lateral curvature desired in the resultant molded part. Accordingly, cutting lines 24 on the plate 12 reflect the desired lateral contour whereupon the plate is then cut such as by a saw blade as used in the fabrication of the side plates 3, and produces a kerf 25 which results in the formation of the contoured edge portion 13' and the intermediate neck portion 16.

Prior to fixation of the contoured punch forming plate 12 upon the contoured edges 11 of the two punch element side plates 5, the plate 12 is pre-deformed in a vertical plane to facilitate its precise attachment to the balance of the punch element. As shown in FIG. 5, any suitable means such as a plurality of bending elements 26 are applied to the forming plate 12 to vertically deform same such that the resultant radius defined by the deformed plate will be smaller than the radius defined by the punch element side plate contoured edges 11. The described relationship will be more readily apparent from a review of FIG. 6 of the drawings, which depicts the assembly of the punch forming plate 12 with the balance of the punch element structure and wherein it will be noted that when the deformed plate 12 is disposed atop the side plate contoured edges 11, the ends 27 thereof are noticeably elevated above the ends 28 of the side plates. The fixation of the undersurface 29 of the punch forming plate 12 to the side plates 5 is initiated at the very central portion of the necked-in area 16 with the weld beads 15 progressing outwardly therefrom toward the ends 28 and 27. This application of the weld beads progresses substantially equally to the ends of the assembly with the progressive deflection and engagement of the punch forming plate undersurface 29 with the juxtaposed side plate contoured edges 11.

With the foregoing assembly procedure, it will be appreciated that a more precise attachment of the constant thickness forming plate 12 is achieved with the juxtaposed side plates 5 such that any distortion between the joined components is minimized thereby insuring maintenance of the desired vertical contour offered by the top primary mold surface 30 of the punch forming plate 12, which surface will later be employed to form one side of the molded part.

The distal portions of each of the components forming the punch element as described above will be understood to offer a ragged or uneven configuration at the two ends of the assembly and accordingly, a vertical cut-off or trim line 31 is described immediately inwardly of the ends 27 and 28 such that when the line 31 is cut and the waste 32 removed, a flush, trimmed edge 33 is produced at both ends of the assembly. These trimmed edges 33 are enclosed as shown in FIG. 8 of the drawings, by the application of the pair of end plates 17 which serve to completely enclose the aforedescribed chamber 10.

The chamber 10 will be understood to serve as means receiving an appropriate heat transfer medium such as water, during molding operation. Accordingly, at least a pair of the fittings 18-19 are provided to allow for a continuous flow of such fluid throughout the confines of the chamber 10. As is well known in the art, heated fluid may be employed to produce curing of a thermosetting plastic composition while a cooled fluid would be utilized if a thermoplastic composition is involved.

Figure 16:
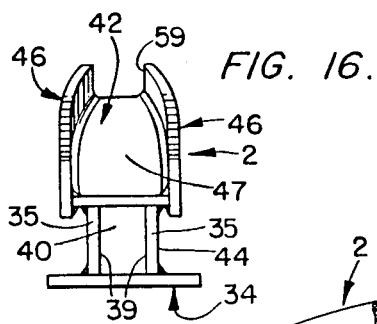
FIG. 16 is an end elevation taken along the line 16—16 of FIG. 15.
Figure 17:
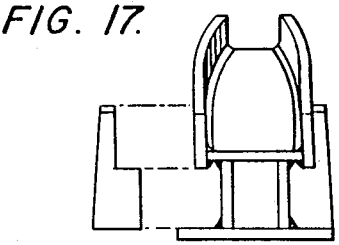
FIG. 17 is a view similar to FIG. 16 and illustrates the attachment of reinforcing gussets.
Figure 18:
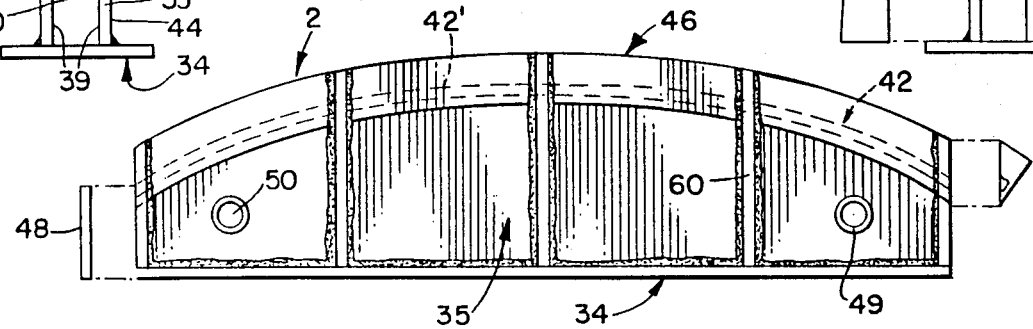
FIG. 18 is a side elevation illustrating the attachment of an end plate and the removal of trim at respective ends of the cavity element.

The cavity element or female mold component 2 of the present invention is fabricated from a plurality of flat sheet metal plates of minimal thickness and its construction will most readily be apparent from a review of FIGS. 15 and 16 of the drawings. A planar mounting or base plate 34 similar to the mounting plate 4 of the punch element 1, serves to retain a pair of support plates 35—35 each having a planar edge 36 affixed to the intermediate portion of the first surface 37 of the mounting plate 34. As in the case of the punch element, the two support plates 35 will be seen to be spaced inwardly from the longitudinally extending lateral edges 38—38 of the mounting plate while the inner faces 39 of the two support plates are well spaced apart from one another to define a chamber 40 therebetween. The edge of the two support plates 35 opposite that of the planar edge 36 is contoured as at 41, which contour quite obviously is configured according to the desired molded part as well as dependent upon the cooperating punch forming plate 12 of the punch or mold element 1.

A mold cavity plate 42 defining a primary cavity mold surface 42' is affixed to the contoured edges 41 with the lateral edges 43 of the plate extending at least to the plane of the outer faces 44 of the two support plates 35. Preferably, the lateral edges 43 extend well beyond the outer faces 44 for reasons which will become obvious hereinafter. As in the case of the punch forming plate 12, the mold cavity plate 42 includes a mating contoured edge 43' adjacent a central necked-in portion 45. Engaging the entire longitudinal extent of each lateral edge 43 and 43' is a side cavity plate 46 which will be seen to form, together with the plate 42, the female mold cavity 47 while appropriate end plates 48 seal off both ends of the assembly to fully enclose the chamber 40. Suitable fluid fittings provide an inlet 49 and 50 communicating with this chamber as in the case of the punch element 1.

The method of fabricating the above described cavity element 2 will be readily apparent from a review of FIGS. 9 through 18 of the drawings. The two support plates 35—35 are fabricated similar to the two side plates 3—3 of the punch element 1 as shown in FIG. 9. In this instance, the cutting line 51 provides a quide for producing a convex contoured edge 41 on each of the two support plates 35 after which these plates are affixed, such as by means of the weld bead 52, to the first surface 37 of the mounting plate 34.

The mold cavity plate 42 is fabricated from a single flat sheet metal plate with a cutting line 53 defining the extent of the desired contoured edge 43'. After the mold cavity plate 42 is appropriately contoured along its lateral edges, the plate is pre-deformed by any suitable means such as by bending elements 26 as utilized in connection with the punch forming plate 12. In this instance, however, the undersurface 54 of the mold cavity plate is bent to yield a plate radius which is greater than the radius of convex support plate contoured edges 41.

With the above described relationship in mind, it will follow that upon placing the mold cavity plate 42 atop the contoured edges 41—41 only the medial portion thereof will actually engage the two support plates 35. Thereafter, the components are affixed such as by the weld bead 55, from the center area of the assembly outwardly in the direction of the arrows of FIG. 13 with the mold cavity plate 42 being progressively deflected downwardly toward its ends 56. Just as in the case of the punch element 1, this manner of assembly insures the utmost in maintenance of precision by eliminating any tendency for an uneven attachment between the juxtaposed undersurface 54 of the cavity plate 42 and the contoured edges 41.

Figure 14:
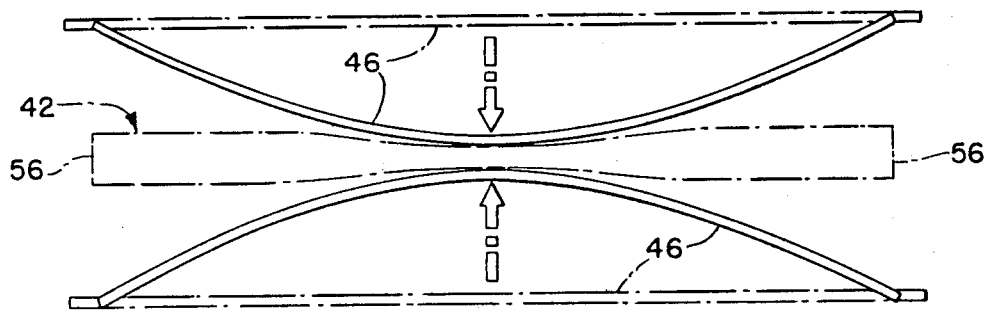
FIG. 14 is a top plan view illustrating the fabrication of a pair of side cavity plates.

The mold cavity 47 atop the cavity plate 42 is completed by the application of the pair of side cavity plates 46—46 which will be seen from FIGS. 14 and 15 to comprise a pair of initially flat metal plates having curved upper and lower edges 57 and 58. The inner wall 59 of each plate is affixed to the lateral edge 43—43' of the cavity plate 42, again by pre-deforming the two side cavity plates 46 such as illustrated in FIG. 14, to allow fixation thereto by initial contact between the assembly at the central portion only with progressive bending and welding together of the components in an outward direction toward the ends 56 of the cavity plate 42. Quite obviously if the cavity plate 42 is only curved vertically and is not laterally contoured then this last mentioned pre-deforming operation would not apply.

In view of the stresses which the side cavity plates 46 and mold cavity plate 42 will be subjected to, it is recommended that a plurality of vertically disposed gussets 60 be welded to the first surface 37 of the mounting plate 34 and extend upwardly to both underlie the lower edge of each side cavity plate 46 and overlie the outer face 61 thereof. Again, the uneven portions of the various components at the two ends of the cavity element 2 are trimmed off as in the right hand portion of FIG. 18 prior to the fixation of the end plates 48—48 which latter fully enclose the chamber 40.

Figure 19:
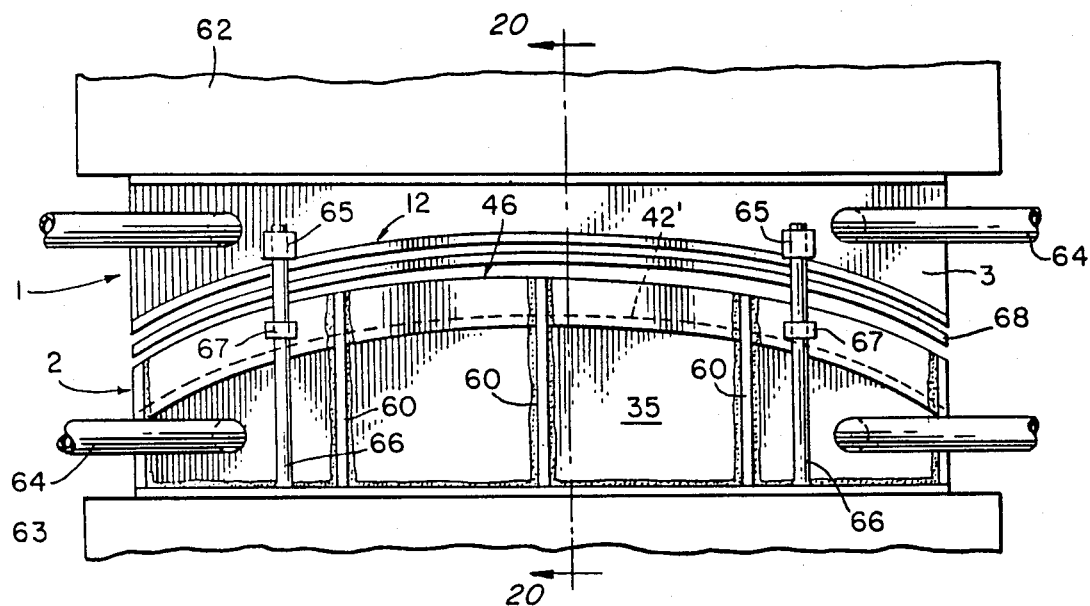
FIG. 19 is a side elevation disclosing the punch and cavity elements of the present invention installed within a molding apparatus with the apparatus opened and as it would appear before or after the formation of a molded part.

FIG. 19 of the drawings illustrates a typical molding apparatus wherein the punch element 1 will be seen to be suitably attached by means of its mounting plate 4 to an upper press member 62 while the opposed lower press member 63 serves to support the cavity element 2 by means of its mounting plate 34. Appropriate flexible conduits 64 are joined to the respective fluid fittings 18-19 and 49-50 to supply either heated or cooled fluid according to the type of molding composition being employed.

As is well know to those skilled in the art, the tolerances required between the cooperating areas of the punch and cavity elements are very close and in order to maintain the critical vertical alignment between the present fabricated punch and cavity elements during the compression stage, it is proposed to include appropriate guide means to insure this critical alignment between the reciprocating elements. Accordingly, female guide members 65, such as sleeves, are welded to the outside of the punch element 1 at a plurality of spaced apart locations and cooperate with male guide members 66, such as rod elements, closely fitting within the female guide members 65 and attached to the outside of the cavity element 2. A stop collar 67 carried by the male guide members 66, and which may be adjustably positionable, limits the closing movement between the opposed mold components 1 and 2 thus insures maintenance of the proper vertical thickness of the resultant molded part 68.

Figure 20:
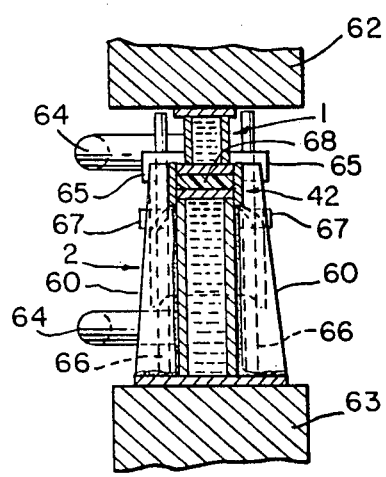
FIG. 20 is a transverse section through the medial portion of the apparatus of FIG. 19 as it would appear when in a closed position.

The above guide and stop members will be understood to establish the vertical spacing between the mating curvature of the opposed primary mold surfaces 30 and 42' of the punch and cavity elements respectively, when the molding apparatus is in the closed position of FIG. 20, thereby defining the thickness of the molded part 68.

From the foregoing, it will be appreciated that an improved method and apparatus is presented for the construction of compression molding elements comprising a plurality of cut and/or deformed flat metal plates assembled to provide an elongated mold cavity yielding a molded plastic part which may be vertically and/or horizontally contoured. The present mold elements are readily adaptable for the production of various elongated parts from either thermoplastic or thermosetting compositions. A product of particular merit comprises leaf springs formed from a suitable reinforced plastic composition and serving as an improved substitute for metal leaf springs as used on lightweight vehicles.

We claim:
1. The method of making punch and cavity compression mold elements from stock comprising plate material, including the steps: forming a punch element by providing a base plate, cutting a pair of side plates to provide side plates each having contoured edges opposite planar edges, affixing said side plate planar edges to said base plate with said side plates laterally spaced apart to provide a chamber therebetween, providing a punch forming plate having a width no less than the lateral dimension defined by said two affixed side plates, attaching said forming plate throughout its length to said two side plates contoured edges, mounting end plates at opposite portions of said base plate, side plates and forming plate to enclose said chamber, forming said contoured edges of said side plates with a concave configuration, and said method includes pre-forming said punch forming plate with a radius less than that of said contoured edges of said side plates with said attaching of said forming plate beginning at the medial point of the forming plate and progressing to the end thereof; and forming a cavity element adapted to cooperate with said punch element by providing a base plate, cutting a pair of support plates to provide contoured edges and oppositely disposed planar edges, affixing said support plate planar edges to said cavity base plate with said support plates laterally spaced apart to provide a chamber therebetween, providing a mold cavity plate having a width no less than the lateral dimension defined by said two affixed support plates, attaching said mold cavity plate throughout its length to said two support plate contoured edges, mounting end plates at opposite portions of said cavity element base plate, support plates and mold cavity plate to enclose said chamber, and attaching side plates to the lateral edges of said mold cavity plate with upstanding portions defining a mold cavity therebetween adapted to closely receive said punch element forming plate.

2. The method according to claim 1 including, contouring the lateral edges of said punch forming plate and said cavity mold plate to provide a variable width along their length.

3. A method according to claim 1 including attaching inlet and outlet means to said punch and cavity elements, said inlet and outlet means communicating with said punch and cavity element chambers respectively and adapted to transmit fluid through both said chambers to regulate the temperature of said punch and cavity elements.

4. A method according to claim 1 including, mounting mating guide means upon said punch and cavity elements adjacent said punch element forming plate and adjacent said cavity element side plates to insure transverse and longitudinal alignment between said forming plate and mold plate during reciprocating motion therebetween.

5. The method of making punch and cavity compression mold elements from stock comprising plate material, including the steps: forming a punch element by providing a base plate, cutting a pair of side plates to provide side plates each having contoured edges opposite planar edges, affixing said side plate planar edges to said base plate with said side plates laterally spaced apart to provide a chamber therebetween, providing a punch forming plate having a width no less than the lateral dimension defined by said two affixed side plates, attaching said forming plate throughout its length to said two side plate contoured edges, mounting end plates at opposite portions of said base plate, side plates and forming plate to enclose said chamber; and forming a cavity element adapted to cooperate with said punch element by providing a base plate, cutting a pair of support plates to provide contoured edges and oppositely disposed planar edges, forming said contoured edges of said cavity support with a convex configuration and said method includes, affixing said support plate planar edges to said cavity base plate with said support plates laterally spaced apart to provide a chamber therebetween, providing a mold cavity plate having a width no less than the lateral dimension defined by said two affixed support plates, attaching said mold cavity plate throughout its length to said two support plate contoured edges, mounting end plates at opposite portions of said cavity element base plate, support plates and mold cavity plate to enclose said chamber, attaching side plates to the lateral edges of said mold cavity plate with upstanding portions defining a mold cavity therebetween adapted to closely receive said punch element forming plate, pre-forming said mold cavity plate with a radius greater than that of said contoured edges of said cavity support plate with said attaching of said cavity plate beginning at the medial point of the cavity support plate and progressing to the ends thereof.

6. The method according to claim 5 including, contouring the lateral edges of said punch forming plate and said cavity mold plate to provide a variable width along their lengths.

7. A method according to claim 5 including attaching inlet and outlet means to said punch and cavity elements, said inlet and outlet means communicating with said punch and cavity element chambers respectively and adapted to transmit fluid through both said chambers to regulate the temperature of said punch and cavity elements.

8. A method according to claim 5 including, mounting mating guide means upon said punch and cavity elements adjacent said punch element forming plate and adjacent said cavity element side plates to insure transverse and longitudinal alignment between said forming plate and mold plate during reciprocating motion therebetween.

* * * * *